(12) United States Patent
Kim

(10) Patent No.: US 10,001,413 B2
(45) Date of Patent: Jun. 19, 2018

(54) TEMPERATURE SENSING CIRCUITS

(71) Applicant: Samsung Electronics Co., Ltd., Suwon-si (KR)

(72) Inventor: Woo-Seok Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 782 days.

(21) Appl. No.: 14/569,861

(22) Filed: Dec. 15, 2014

(65) Prior Publication Data

US 2015/0198485 A1    Jul. 16, 2015

(30) Foreign Application Priority Data

Jan. 16, 2014 (KR) .................. 10-2014-0005724

(51) Int. Cl.
*G01K 7/00*    (2006.01)
*G01K 7/01*    (2006.01)

(52) U.S. Cl.
CPC ..................... *G01K 7/01* (2013.01)

(58) Field of Classification Search
USPC .......................................... 374/178; 327/512
See application file for complete search history.

(56) References Cited

U.S. PATENT DOCUMENTS

| | | | |
|---|---|---|---|
| 4,243,898 A | 1/1981 | Seelbach | |
| 4,652,144 A | 3/1987 | Günther et al. | |
| 7,368,973 B2 | 5/2008 | Sato | |
| 7,372,245 B2 | 5/2008 | Ito et al. | |
| 8,210,743 B2 | 7/2012 | Hasegawa | |
| 2004/0062292 A1* | 4/2004 | Pennock | G01K 7/015 374/170 |
| 2004/0081224 A1* | 4/2004 | Umeyama | G01K 7/01 374/178 |
| 2006/0138582 A1* | 6/2006 | Han | G01K 7/01 257/467 |
| 2008/0165826 A1* | 7/2008 | Cheng | G01K 1/20 374/178 |
| 2008/0279254 A1* | 11/2008 | Liu | G05F 3/267 374/178 |
| 2009/0296780 A1* | 12/2009 | Lee | G01K 7/01 374/178 |
| 2012/0327972 A1* | 12/2012 | Seon | G01K 7/01 374/178 |

FOREIGN PATENT DOCUMENTS

KR    1020090114986    11/2009

* cited by examiner

*Primary Examiner* — Mirellys Jagan
(74) *Attorney, Agent, or Firm* — Myers Bigel, P.A.

(57) ABSTRACT

Temperature sensing circuits are provided. The temperature sensing circuits may include a temperature sensing unit and a buffer unit. The temperature sensing unit may include a transistor that has a first pair of terminals having a first PN junction of the transistor therebetween and a second pair of terminals having a second PN junction of the transistor therebetween. The first pair of terminals are connected together. The temperature sensing unit may output a first temperature sensing voltage comprising a voltage between the second pair of terminals at a first node. The buffer unit may be connected to the first node. The buffer unit may have a cascode follower structure and may output a second temperature sensing voltage that has a magnitude proportional to a magnitude of the first temperature sensing voltage at a second node.

19 Claims, 7 Drawing Sheets

TEMPERATURE SENSING CIRCUITS

CROSS-REFERENCE TO RELATED APPLICATION

This U.S. non-provisional application claims priority under 35 U.S.C. § 119 to Korean Patent Application No. 10-2014-0005724, filed on Jan. 16, 2014, in the Korean Intellectual Property Office, the disclosure of which is hereby incorporated by reference herein in its entirety.

BACKGROUND

The present disclosure generally relates to the field of electronics and, more particularly, integrated circuit devices.

A temperature change of an integrated circuit device included in an electronic system may be considered to operate the system correctly. A bipolar transistor operating as a diode may be used to measure a temperature because a voltage between a base and an emitter of the bipolar transistor may change according to a temperature.

SUMMARY

A temperature sensing circuit may include a sensing circuit and a buffer circuit. The sensing circuit may be configured to measure a temperature of an integrated circuit device using a change of a forward voltage of a transistor that operates as a diode responsive to the temperature. The sensing circuit may be configured to output a first temperature sensing voltage, corresponding to the forward voltage of the transistor, at a first node. The buffer circuit may have a cascode emitter-follower structure. The buffer circuit may be configured to buffer the first temperature sensing voltage and to output a second temperature sensing voltage at a second node.

According to various embodiments, the sensing circuit may have a cascode current mirror structure.

According to various embodiments, a current flowing through the buffer circuit may have a magnitude that may be substantially equal to a magnitude of a current flowing through the sensing circuit.

In various embodiments, the temperature sensing circuit may also include a current source that may be connected to a power source that may be configured to provide a supply voltage and may be configured to supply a current to the buffer circuit.

According to various embodiments, the sensing circuit may include a first NPN transistor having a base and a collector commonly connected to the first node, a second NPN transistor having a base connected to the base of the first NPN transistor, and a collector connected to the second node, a third NPN transistor having a base and a collector commonly connected to an emitter of the first NPN transistor, and an emitter connected to a ground voltage and a fourth NPN transistor having a base connected to the base of the third NPN transistor, a collector connected to an emitter of the second NPN transistor, and an emitter connected to the ground voltage.

In various embodiments, the temperature sensing circuit may be disposed in the integrated circuit device. The transistor that operates as a diode may include the first NPN transistor and the third NPN transistor, and the forward voltage of the transistor may include a forward voltage between the base and the emitter of the first NPN transistor and a forward voltage between the base and the emitter of the third NPN transistor.

In various embodiments, the buffer circuit may include a fifth NPN transistor having a base and a collector commonly connected to the current source, a sixth NPN transistor having a base connected to the base of the fifth NPN transistor, and a collector connected to the power source, a seventh NPN transistor having a base and a collector commonly connected to an emitter of the fifth NPN transistor, and an emitter connected to the first node and an eighth NPN transistor having a base connected to the base of the seventh NPN transistor, a collector connected to an emitter of the sixth NPN transistor, and an emitter connected to the second node.

According to various embodiments, the temperature sensing circuit may further include at least one NPN transistor connected in a diode form between the emitter of the seventh NPN transistor and the first node.

In various embodiments, the sensing circuit may include a first NPN transistor having a base and a collector commonly connected to the first node, a second NPN transistor having a base connected to the base of the first NPN transistor and a collector connected to the second node.

According to various embodiments, the buffer circuit may include a third NPN transistor having a base and a collector commonly connected to the current source, a fourth NPN transistor having a base connected to the base of the third NPN transistor, and a collector connected to the power source, a fifth NPN transistor having a base and a collector commonly connected to an emitter of the third NPN transistor, and an emitter connected to the first node and a sixth NPN transistor having a base connected to the base of the fifth NPN transistor, a collector connected to an emitter of the fourth NPN transistor, and an emitter connected to the second node.

A temperature sensing circuit may include a sensing circuit and a buffer circuit. The sensing circuit may be configured to measure a temperature of an integrated circuit device using a change of a forward voltage of a transistor that operates as a diode responsive to the temperature. The sensing circuit may be configured to output a first temperature sensing voltage, corresponding to the forward voltage of the transistor, at a first node. The buffer circuit may have a cascode source-follower structure. The buffer circuit may be configured to buffer the first temperature sensing voltage and to output a second temperature sensing voltage at a second node.

According to various embodiments, the temperature sensing circuit may also include a current source that may be connected to a power source that may be configured to a supply voltage and may be configured to supply a current to the buffer circuit.

In various embodiments, the sensing circuit may include a first NPN transistor having a base and a collector commonly connected to the first node, a second NPN transistor having a base connected to the base of the first NPN transistor, and a collector connected to the second node, a third NPN transistor having a base and a collector commonly connected to an emitter of the first NPN transistor, and an emitter connected to a ground voltage and a fourth NPN transistor having a base connected to the base of the third NPN transistor, a collector connected to an emitter of the second NPN transistor, and an emitter connected to the ground voltage.

In various embodiments, the buffer circuit may include a first NMOS transistor having a gate and a drain commonly connected to the current source, a second NMOS transistor having a gate connected to the gate of the first NMOS transistor, and a drain connected to the power source, a third NMOS transistor having a gate and a drain commonly connected to a source of the first NMOS transistor, and a source connected to the first node and a fourth NMOS transistor having a gate connected to the gate of the third NMOS transistor, a drain connected to a source of the second NMOS transistor, and a source connected to the second node.

According to various embodiments, the temperature sensing circuit may further include at least one NPN transistor connected in a diode form between the source of the third NMOS transistor and the first node.

A temperature sensing circuit may include a sensing circuit and a buffering circuit. The sensing circuit may include a transistor that has a first pair of terminals having a first PN junction of the transistor therebetween and a second pair of terminals having a second PN junction of the transistor therebetween. The first pair of terminals are connected together, and the sensing circuit may be configured to output a first temperature sensing voltage comprising a voltage between the second pair of terminals at a first node. The buffering circuit may have an input connected to the first node. The buffering circuit may have a cascode follower structure and may be configured to output a second temperature sensing voltage that may have a magnitude proportional to a magnitude of the first temperature sensing voltage at a second node.

In various embodiments, the transistor may include a first transistor having a third pair of terminals having a third PN junction of the first transistor therebetween and a fourth pair of terminals having a fourth PN junction of the first transistor therebetween. The third pair of terminals may be connected together. The sensing circuit may further include a second transistor between the first transistor and the first node. The second transistor may have a fifth pair of terminals having a fifth PN junction of the second transistor therebetween and a six pair of terminals having a six PN junction of the second transistor therebetween. The fifth pair of terminals may be connected together. The first temperature sensing voltage may include a first voltage between the fourth pair of terminals of the first transistor and the sixth pair of terminals of the second transistor.

According to various embodiments, the temperature sensing circuit may further include a power source configured to provide a supply voltage and a current source connected to the power source. The current source may be configured to supply a current to the buffering circuit.

In various embodiments, the buffering circuit may have a cascode emitter-follower structure including a first bipolar transistor having a first base and a first collector connected together and are connected to the current source, a second bipolar transistor having a second base that may be connected to the first base and a second collector that may be connected to the power source, a third bipolar transistor having a third base and a third collector connected together and are connected to a first emitter of the first bipolar transistor and a third emitter that may be connected to the first node, and a fourth bipolar transistor having a fourth base that may be connected to the third base, a fourth collector that may be connected to a second emitter of the second bipolar transistor and a fourth emitter that may be connected to the second node.

In various embodiments, the buffering circuit may have a cascode source-follower circuit including a first field effect transistor having a first gate and a first drain connected together and are connected to the current source, a second field effect transistor having a second gate that may be connected to the first gate and a second drain that may be connected to the power source, a third field effect transistor having a third gate and a third drain connected together and connected to a first source of the first field effect transistor and a third source that may be connected to the first node, and a fourth field effect transistor having a fourth gate that may be connected to the third gate, a fourth drain that may be connected to a second source of the second field effect transistor and a fourth source that may be connected to the second node.

According to various embodiments, the buffering circuit may have less than two inputs.

According to various embodiments, the input of the buffering circuit may be not a differential input.

DETAILED DESCRIPTION

Figure 1:
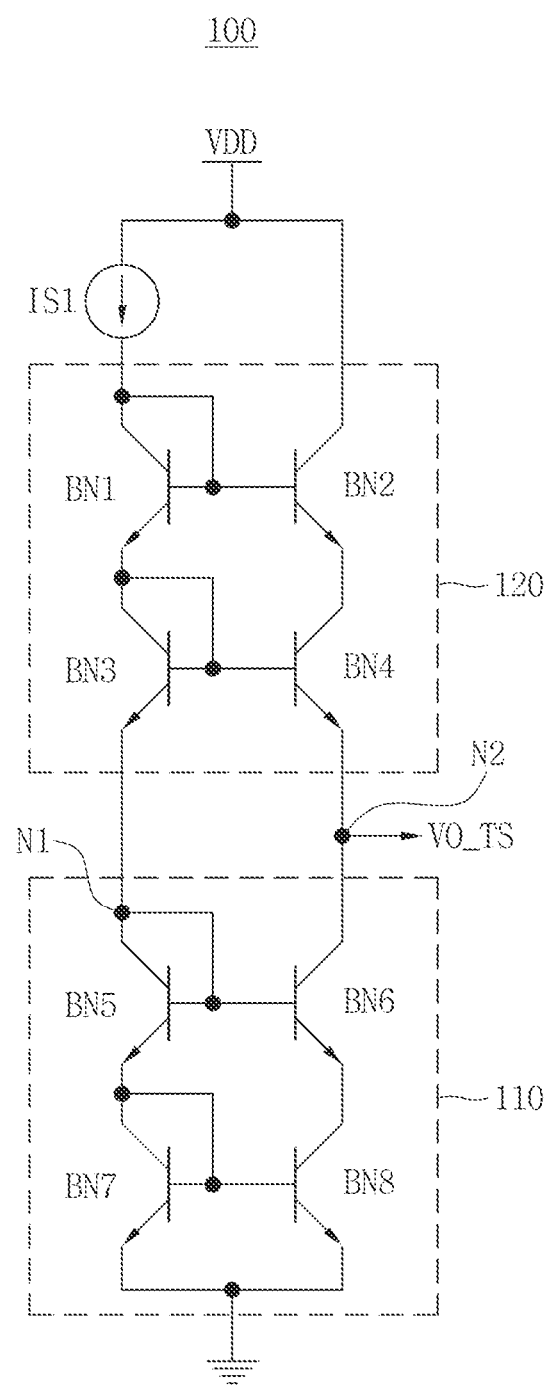
FIG. 1 is a circuit diagram illustrating a temperature sensing circuit in accordance with some embodiments of the present inventive concept.

Various embodiments are described with reference to the accompanying drawings. Many different forms and embodiments are possible without deviating from the spirit and teachings of this disclosure and so the disclosure should not be construed as limited to the example embodiments set forth herein. Rather, these embodiments are provided so that this disclosure will be thorough and complete and will fully convey the scope of the disclosure to those skilled in the art. In the drawings, the sizes and relative sizes of regions may be exaggerated for clarity.

It will be understood that when an element or layer is referred to as being "on," "connected to," or "coupled with" another element or layer, it can be directly on, connected to or coupled with the other element or layer or intervening elements or layers may be present. In contrast, when an element is referred to as being "directly on," "directly connected to," or "directly coupled with" another element or layer, there are no intervening elements or layers present. Like numerals refer to like elements throughout. As used herein, the term "and/or" includes any and all combinations of one or more of the associated listed items.

It will be understood that, although the terms first, second, third, etc. may be used herein to describe various elements, components, regions, and/or sections, these elements, components, regions, and/or sections should not be limited by these terms. These terms are only used to distinguish one element, component, region, or section from another element, component, region, or section. Thus, a first element, component, region, or section could be termed a second element, component, region, or section without departing from the teachings of the disclosure.

Spatially relative terms, such as "beneath," "below," "lower," "above," "upper," and the like, may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations), and the spatially relative descriptors used herein may be interpreted accordingly.

The terminology used herein is for the purpose of describing particular embodiments only and is not intended to be limiting of the present inventive concept. As used herein, the singular forms "a," "an," and "the" are intended to include the plural forms as well, unless the context clearly indicates otherwise. It will be further understood that the terms "comprise" and "include," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

It will be understood that the term "follower structure" refers to an "emitter follower structure" or a "source follower structure." It will be further understood that the transistors described herein can be any electrically controllable switching device which can be configured to operate as, for example, a bipolar junction transistor (BJT) or a field effect transistor (FET) in a diode connected configuration. It will be also understood that NPN transistors can be replaced with PNP transistors.

FIG. 1 is a circuit diagram illustrating a temperature sensing circuit in accordance with some embodiments of the present inventive concept. Referring to FIG. 1, a temperature sensing circuit 100 may include a temperature sensing unit 110 and a buffer unit 120.

The temperature sensing unit 110 may measure a temperature of an integrated circuit (IC) chip using a change of a forward voltage of a transistor, which operates as a diode, according to the temperature. For example, the IC chip may be a semiconductor chip. The temperature sensing unit 110 may output a first temperature sensing voltage at a first node N1. The buffer unit 120 may be connected to the first node N1, which is an input of the buffer unit 120. The buffer unit 120 may have less than two inputs and may not have differential inputs. The buffer unit 120 may buffer the first temperature sensing voltage and may output a second temperature sensing voltage VO_TS at a second node N2. The second temperature sensing voltage VO_TS may be proportional to the first temperature sensing voltage. In some embodiments of the present inventive concept, the buffer unit 120 may have a cascode emitter-follower structure.

A current flowing through the buffer unit 120 may have a magnitude substantially equal to a magnitude of a current flowing through the temperature sensing unit 110. In some embodiments of the present inventive concept, the temperature sensing unit 110 may have a cascode current mirror structure.

The temperature sensing circuit 100 may further include a current source IS1 that may be connected to a supply voltage VDD and may supply a current to the buffer unit 120. It will be understood that the supply voltage VDD may be provided by a power source.

The temperature sensing unit 110 may include a first NPN transistor BN5, a second NPN transistor BN6, a third NPN transistor BN7, and a fourth NPN transistor BN8. The first NPN transistor BN5 may have a base and a collector commonly connected to the first node N1. The second NPN transistor BN6 may have a base connected to the base of the first NPN transistor BN5, and a collector connected to the second node N2. The third NPN transistor BN7 may have a base and a collector commonly connected to an emitter of the first NPN transistor BN5, and an emitter connected to a ground voltage. The fourth NPN transistor BN8 may have a base connected to the base of the third NPN transistor BN7, a collector connected to an emitter of the second NPN transistor BN6, and an emitter connected to the ground voltage.

The temperature sensing unit 110 may measure a temperature of an IC chip in which the temperature sensing circuit 100 is placed by detecting a change of a voltage between the base and the emitter of the first NPN transistor BN5 and a voltage between the base and the emitter of the third NPN transistor BN7 according to a temperature. Each of the first NPN transistor BN5 and the third NPN transistor BN7 may be connected in a diode form. It will be understood that each of the first NPN transistor BN5 and the third NPN transistor BN7 operates as a diode.

The buffer unit 120 may include a fifth NPN transistor BN1, a sixth NPN transistor BN2, a seventh NPN transistor BN3, and an eighth NPN transistor BN4. The fifth NPN transistor BN1 may have a base and a collector commonly connected to the current source IS1. The sixth NPN transistor BN2 may have a base connected to the base of the fifth NPN transistor BN1, and a collector connected to the supply voltage VDD. The seventh NPN transistor BN3 may have a base and a collector commonly connected to an emitter of the fifth NPN transistor BN1, and an emitter connected to the first node N1. The eighth NPN transistor BN4 may have a base connected to the base of the seventh NPN transistor BN3, a collector connected to an emitter of the sixth NPN transistor BN2, and an emitter connected to the second node N2.

It will be understood that a voltage between a base and an emitter of a bipolar transistor, which operates as a diode, linearly decreases as a temperature increases. Therefore, a temperature of a system that includes an IC chip may be measured by detecting a voltage between a base and an emitter of a bipolar transistor connected in a diode form.

According to some embodiments of the present inventive concept, the buffer unit 120 may have a cascode emitter-follower structure, and the second temperature sensing voltage at the second node N2 may thus be substantially equal to the first temperature sensing voltage at the first node N1. Further, in some embodiments of the present inventive concept, the temperature sensing unit 110 may have a cascode current mirror structure, and therefore a difference between the first temperature sensing voltage at the first node N1 and the second temperature sensing voltage at the second node N2 due to the Early effect of a transistor may be canceled.

The temperature sensing circuit 100 may output a temperature sensing voltage that is not distorted by an external load or noise because the temperature sensing circuit 100 includes the buffer unit 120. In some embodiments of the present inventive concept, the buffer unit 120 may have a cascode emitter-follower structure connected to the temperature sensing unit 110. The buffer unit 120 may not include an operational amplifier.

Figure 2:
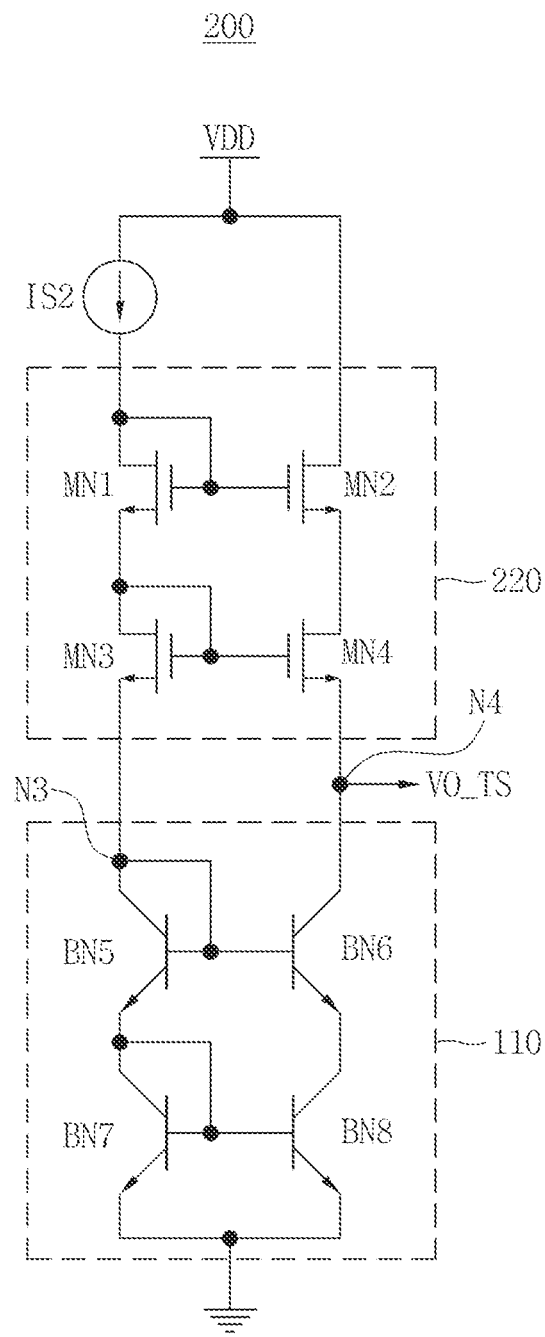
FIG. 2 is a circuit diagram illustrating a temperature sensing circuit in accordance with some embodiments of the present inventive concept.

FIG. 2 is a circuit diagram illustrating a temperature sensing circuit in accordance with some embodiments of the present inventive concept. Referring to FIG. 2, a temperature sensing circuit 200 may include a temperature sensing unit 110 and a buffer unit 220.

The temperature sensing unit 110 may measure a temperature of an IC chip using a change of a forward voltage of a transistor, which operates as a diode, according to the temperature. The temperature sensing unit 110 may output a first temperature sensing voltage at a first node N3. The buffer unit 220 may be connected to the first node N3, which is an input of the buffer unit 220. The buffer unit 220 may have less than two inputs and may not have differential inputs. The buffer unit 220 may buffer the first temperature sensing voltage and may output a second temperature sensing voltage VO_TS at a second node N4. In some embodiments, the buffer unit 220 may have a cascode source-follower structure. The second temperature sensing voltage VO_TS may be proportional to the first temperature sensing voltage.

A current flowing through the buffer unit 220 may have a magnitude substantially equal to a magnitude of a current flowing through the temperature sensing unit 110. In some embodiments, the temperature sensing unit 110 may have a cascode current mirror structure.

The temperature sensing circuit 200 may further include a current source IS2 that may be connected to a supply voltage VDD and may supply a current to the buffer unit 220.

The temperature sensing unit 110 may include a first NPN transistor BN5, a second NPN transistor BN6, a third NPN transistor BN7, and a fourth NPN transistor BN8. The first NPN transistor BN5 may have a base and a collector commonly connected to the first node N3. The second NPN transistor BN6 may have a base connected to the base of the first NPN transistor BN5, and a collector connected to the second node N4. The third NPN transistor BN7 may have a base and a collector commonly connected to an emitter of the first NPN transistor BN5, and an emitter connected to a ground voltage. The fourth NPN transistor BN8 may have a base connected to the base of the third NPN transistor BN7, a collector connected to an emitter of the second NPN transistor BN6, and an emitter connected to the ground voltage.

The temperature sensing unit 110 may measure a temperature of an IC chip in which the temperature sensing circuit 200 is placed by detecting a change of a voltage between the base and the emitter of the first NPN transistor BN5 and a voltage between the base and the emitter of the third NPN transistor BN7 according to a temperature. Each of the first NPN transistor BN5 and the third NPN transistor BN7 may be connected in a diode form. It will be understood that each of the first NPN transistor BN5 and the third NPN transistor BN7 operates as a diode.

The buffer unit 220 may include a first NMOS transistor MN1, a second NMOS transistor MN2, a third NMOS transistor MN3, and a fourth NMOS transistor MN4. The first NMOS transistor MN1 may have a gate and a drain commonly connected to the current source IS2. The second NMOS transistor MN2 may have a gate connected to the gate of the first NMOS transistor MN1, and a drain connected to the supply voltage VDD. The third NMOS transistor MN3 may have a gate and a drain commonly connected to a source of the first NMOS transistor MN1, and a source connected to the first node N3. The fourth NMOS transistor MN4 may have a gate connected to the gate of the third NMOS transistor MN3, a drain connected to a source of the second NMOS transistor MN2, and a source connected to the second node N4.

According to some embodiments, the buffer unit 220 may have a cascode source-follower structure, and the second temperature sensing voltage at the second node N4 may thus be substantially equal to the first temperature sensing voltage at the first node N3. Further, in some embodiments, the temperature sensing unit 110 may have a cascode current mirror structure, and therefore a difference between the first temperature sensing voltage at the first node N3 and the second temperature sensing voltage at the second node N4 due to the Early effect of a transistor may be canceled.

The temperature sensing circuit 200 may output a temperature sensing voltage that is not distorted by an external load or noise because the temperature sensing circuit 200 includes the buffer unit 220. In some embodiments, the buffer unit 220 has a cascode source-follower structure connected to the temperature sensing unit 110. The buffer unit 220 may not include an operational amplifier.

Figure 3:
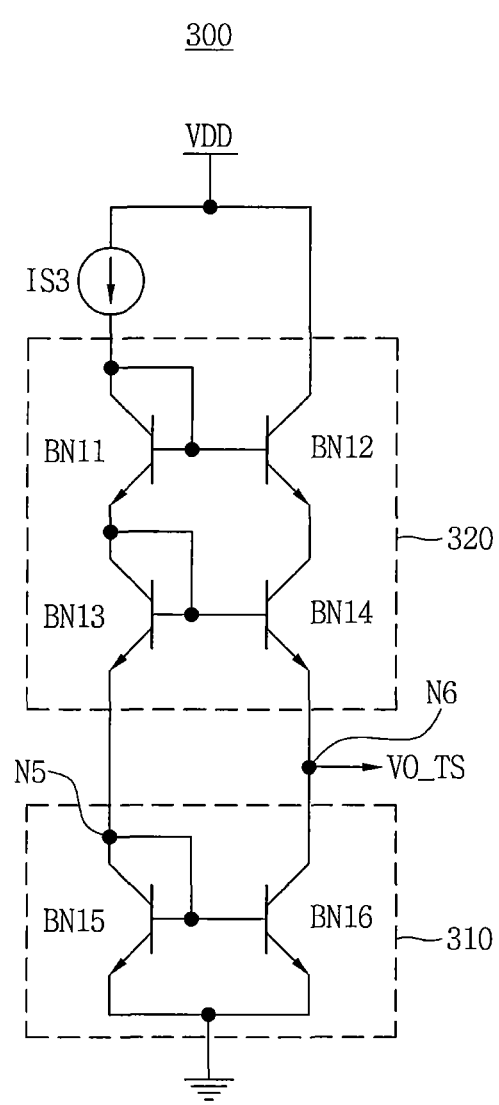
FIG. 3 is a circuit diagram illustrating a temperature sensing circuit in accordance with some embodiments of the present inventive concept.

FIG. 3 is a circuit diagram illustrating a temperature sensing circuit in accordance with some embodiments of the present inventive concept. Referring to FIG. 3, a temperature sensing circuit 300 may include a temperature sensing unit 310 and a buffer unit 320.

The temperature sensing unit 310 may measure a temperature of an IC chip using a change of a forward voltage of a transistor, which operates as a diode, according to the temperature. The temperature sensing unit 310 may output a first temperature sensing voltage at a first node N5. The buffer unit 320 may be connected to the first node N5, which is an input of the buffer unit 320. The buffer unit 320 may have less than two inputs and may not have differential inputs. The buffer unit 320 may buffer the first temperature sensing voltage and may output a second temperature sensing voltage VO_TS at a second node N6. In some embodiments, the buffer unit 320 may have a cascode emitter-follower structure. The second temperature sensing voltage VO_TS may be proportional to the first temperature sensing voltage.

The temperature sensing unit 310 may have a current mirror structure. A current flowing through the buffer unit 320 may have a magnitude substantially equal to a magnitude of a current flowing through the temperature sensing unit 310.

The temperature sensing circuit 300 may further include a current source IS3 that may be connected to a supply voltage VDD and may supply a current to the buffer unit 320.

The temperature sensing unit 310 may include a first NPN transistor BN15 and a second NPN transistor BN16. The first NPN transistor BN15 may have a base and a collector commonly connected to the first node N5, and an emitter connected to a ground voltage. The second NPN transistor BN16 may have a base connected to the base of the first NPN transistor BN15, a collector connected to the second node N6, and an emitter connected to the ground voltage.

The temperature sensing unit 310 may measure a temperature of an IC chip in which the temperature sensing circuit 300 is placed by detecting a change of a voltage between the base and the emitter of the first NPN transistor BN15 according to a temperature. The first NPN transistor BN15 may be connected in a diode form. It will be understood that the first NPN transistor BN15 operates as a diode.

The buffer unit 320 may include a third NPN transistor BN11, a fourth NPN transistor BN12, a fifth NPN transistor BN13, and an sixth NPN transistor BN14. The third NPN transistor BN11 may have a base and a collector commonly connected to the current source IS3. The fourth NPN transistor BN12 may have a base connected to the base of the third NPN transistor BN11, and a collector connected to the supply voltage VDD. The fifth NPN transistor BN13 may have a base and a collector commonly connected to an emitter of the third NPN transistor BN11, and an emitter connected to the first node N5. The sixth NPN transistor BN14 may have a base connected to the base of the fifth NPN transistor BN13, a collector connected to an emitter of the fourth NPN transistor BN12, and an emitter connected to the second node N6.

The temperature sensing circuit 300 may be used to measure a temperature corresponding to a voltage lower than or substantially equal to 1V. The temperature sensing circuit 300 may not include a current mirror having a cascade form.

Figure 4:
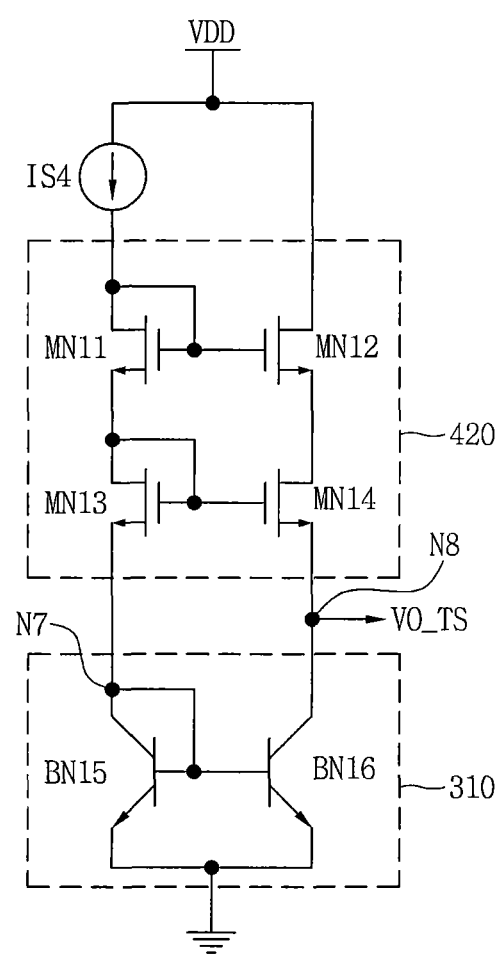
FIG. 4 is a circuit diagram illustrating a temperature sensing circuit in accordance with some embodiments of the present inventive concept.

FIG. 4 is a circuit diagram illustrating a temperature sensing circuit in accordance with some embodiments of the present inventive concept. Referring to FIG. 4, a temperature sensing circuit 400 may include a temperature sensing unit 310 and a buffer unit 420.

The temperature sensing unit 310 may measure a temperature of an IC chip using a change of a forward voltage of a transistor, which operates as a diode, according to the temperature. The temperature sensing unit 310 may output a first temperature sensing voltage at a first node N7. The buffer unit 420 may be connected to the first node N7 which is an input of the buffer unit 420. The buffer unit 420 may have less than two inputs and may not have differential inputs. The buffer unit 420 may buffer the first temperature sensing voltage and may output a second temperature sensing voltage VO_TS at a second node N8. In some embodiments, the buffer unit 420 may have a cascode source-follower structure. The second temperature sensing voltage VO_TS may be proportional to the first temperature sensing voltage.

The temperature sensing unit 310 may have a current mirror structure. A current flowing through the buffer unit 420 may have a magnitude substantially equal to a magnitude of a current flowing through the temperature sensing unit 310.

The temperature sensing circuit 400 may further include a current source IS4 that may be connected to a supply voltage VDD and may supply a current to the buffer unit 420.

The temperature sensing unit 310 may include a first NPN transistor BN15 and a second NPN transistor BN16. The first NPN transistor BN15 may have a base and a collector commonly connected to the first node N7, and an emitter connected to a ground voltage. The second NPN transistor BN16 may have a base connected to the base of the first NPN transistor BN15, a collector connected to the second node N8, and an emitter connected to the ground voltage.

The temperature sensing unit 310 may measure a temperature of an IC chip in which the temperature sensing circuit 400 is placed by detecting a change of a voltage between the base and the emitter of the first NPN transistor BN15 according to a temperature. The first NPN transistor BN15 may be connected in a diode form. It will be understood that the first NPN transistor BN15 operates as a diode.

The buffer unit 420 may include a first NMOS transistor MN11, a second NMOS transistor MN12, a third NMOS transistor MN13, and a fourth NMOS transistor MN14. The first NMOS transistor MN11 may have a gate and a drain commonly connected to the current source IS4. The second NMOS transistor MN12 may have a gate connected to the gate of the first NMOS transistor MN11, and a drain connected to the supply voltage VDD. The third NMOS transistor MN13 may have a gate and a drain commonly connected to a source of the first NMOS transistor MN11, and a source connected to the first node N7. The fourth NMOS transistor MN14 may have a gate connected to the gate of the third NMOS transistor MN13, a drain connected to a source of the second NMOS transistor MN12, and a source connected to the second node N8.

Figure 5:
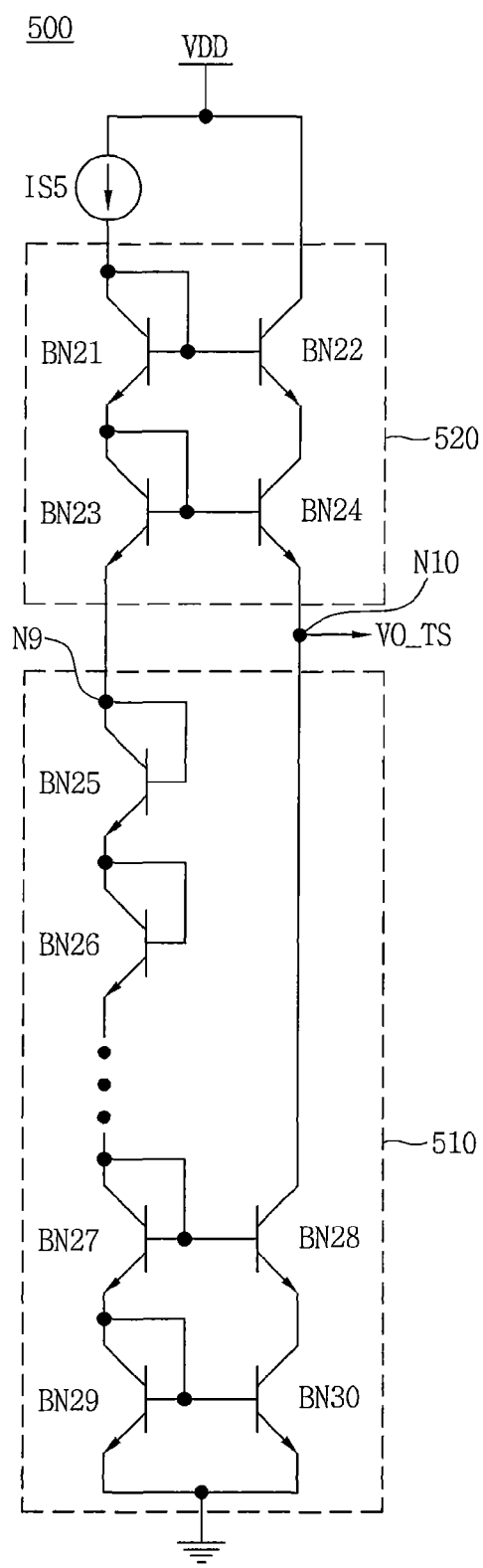
FIG. 5 is a circuit diagram illustrating a temperature sensing circuit in accordance with some embodiments of the present inventive concept.

FIG. 5 is a circuit diagram illustrating a temperature sensing circuit in accordance with some embodiments of the present inventive concept. Referring to FIG. 5, a temperature sensing circuit 500 may include a temperature sensing unit 510 and a buffer unit 520.

The temperature sensing unit 510 may measure a temperature of an IC chip using a change of a forward voltage of a transistor, which operates as a diode, according to the temperature. The temperature sensing unit 510 may output a first temperature sensing voltage at a first node N9. The buffer unit 520 may be connected to the first note N9, which is an input of the buffer unit 520. The buffer unit 520 may have less than two inputs and may not have differential inputs. The buffer unit 520 may buffer the first temperature sensing voltage and may output a second temperature sensing voltage VO_TS at a second node N10. In some embodiments, the buffer unit 520 may have a cascode emitter-follower structure. The second temperature sensing voltage VO_TS may be proportional to the first temperature sensing voltage.

A current flowing through the buffer unit 520 may have a magnitude substantially equal to a magnitude of a current flowing through the temperature sensing unit 510. In some embodiments, the temperature sensing unit 510 may have a cascode current mirror structure.

The temperature sensing circuit 500 may further include a current source IS5 that may be connected to a supply voltage VDD and may supply a current to the buffer unit 520.

The temperature sensing unit 510 may include a first NPN transistor BN29, a second NPN transistor BN30, a third NPN transistor BN27, and a fourth NPN transistor BN28. The first NPN transistor BN29 may have an emitter connected to a ground voltage and a base and a collector connected together. The second NPN transistor BN30 may have a base connected to the base of the first NPN transistor BN29, and an emitter connected to the ground voltage. The third NPN transistor BN27 may have an emitter connected to the collector of the first NPN transistor BN29 and a base and a collector connected together. The fourth NPN transistor BN28 may have a base connected to the base of the third NPN transistor BN27, an emitter connected to a collector of the second NPN transistor BN30, and a collector connected to the second node N10. The temperature sensing unit 510 may further include at least one of NPN transistors BN25 and BN26 between the first node N9 and the collector of the third NPN transistor BN27. Each of the NPN transistors BN25 and BN26 may be connected in a diode form. It will be understood that each of the NPN transistors BN25 and BN26 operates as a diode. In some embodiments, only one NPN transistor may be disposed between the first node N9 and the collector of the third NPN transistor BN27. In some embodiments, more than two NPN transistors may be disposed between the first node N9 and the collector of the third NPN transistor BN27.

The temperature sensing unit 510 may measure a temperature of an IC chip in which the temperature sensing circuit 500 is placed by detecting a change of voltages between a base and a emitter of each of the NPN transistors between the first node N9 and the ground voltage according to a temperature. The NPN transistors between the first node N9 and the ground voltage include the third transistor BN27 and the first transistor BN 29. Each of the NPN transistors between the first node N9 and the ground voltage may be connected in a diode form. It will be understood that each of the third transistor BN27 and the third transistor BN 29 operates as a diode.

The buffer unit 520 may include a fifth NPN transistor BN21, a sixth NPN transistor BN22, a seventh NPN transistor BN23, and an eighth NPN transistor BN24. The fifth NPN transistor BN21 may have a base and a collector commonly connected to the current source IS5. The sixth NPN transistor BN22 may have a base connected to the base of the fifth NPN transistor BN21, and a collector connected to the supply voltage VDD. The seventh NPN transistor BN23 may have a base and a collector commonly connected to an emitter of the fifth NPN transistor BN21, and an emitter connected to the first node N9. The eighth NPN transistor BN24 may have a base connected to the base of the seventh NPN transistor BN23, a collector connected to an emitter of the sixth NPN transistor BN22, and an emitter connected to the second node N10.

The temperature sensing circuit 500 may be used to measure a temperature corresponding to a voltage higher than or substantially equal to 1V.

Figure 6:
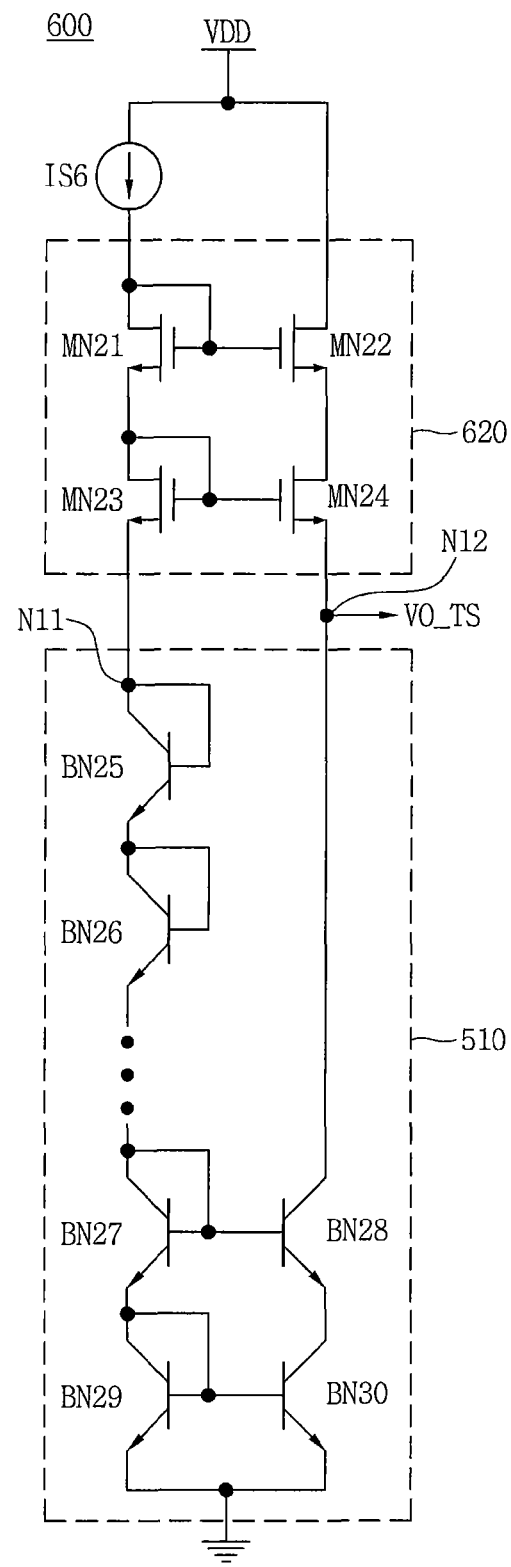
FIG. 6 is a circuit diagram illustrating a temperature sensing circuit in accordance with some embodiments of the present inventive concept.

FIG. 6 is a circuit diagram illustrating a temperature sensing circuit in accordance with some embodiments of the present inventive concept. Referring to FIG. 6, a temperature sensing circuit 600 may include a temperature sensing unit 510 and a buffer unit 620.

The temperature sensing unit 510 may measure a temperature of an IC chip using a change of a forward voltage of a transistor, which operates as a diode, according to the temperature. The temperature sensing unit 510 may output a first temperature sensing voltage at a first node N11. The buffer unit 620 may be connected to the first node N11, which is an input of the buffer unit 620. The buffer unit 620 may have less than two inputs and may not have differential inputs. The buffer unit 620 may buffer the first temperature sensing voltage and may output a second temperature sensing voltage VO_TS at a second node N12. In some embodiments, the buffer unit 620 may have a cascode source-follower structure. The second temperature sensing voltage VO_TS may be proportional to the first temperature sensing voltage.

A current flowing through the buffer unit 620 may have a magnitude substantially equal to a magnitude of a current flowing through the temperature sensing unit 510. In some embodiments, the temperature sensing unit 510 may have a cascode current mirror structure.

The temperature sensing circuit 600 may further include a current source IS6 that may be connected to a supply voltage VDD and may supply a current to the buffer unit 620.

The temperature sensing unit 510 may include a first NPN transistor BN29, a second NPN transistor BN30, a third NPN transistor BN27, and a fourth NPN transistor BN28. The first NPN transistor BN29 may have an emitter connected to a ground voltage and a base and a collector connected together. The second NPN transistor BN30 may have a base connected to the base of the first NPN transistor BN29, and an emitter connected to the ground voltage. The third NPN transistor BN27 may have an emitter connected to the collector of the first NPN transistor BN29, and a base and a collector connected together. The fourth NPN transistor BN28 may have a base connected to the base of the third NPN transistor BN27, an emitter connected to a collector of the second NPN transistor BN30, and a collector connected to the second node N10. The temperature sensing unit 510 may further include at least one of NPN transistors BN25 and BN26 between the first node N9 and the collector of the third NPN transistor BN27. Each of the NPN transistors BN25 and BN26 may be connected in a diode form. It will be understood that each of the NPN transistors BN25 and BN26 operates as a diode. In some embodiments, only one NPN transistor may be disposed between the first node N9 and the collector of the third NPN transistor BN27. In some embodiments, more than two NPN transistors may be disposed between the first node N9 and the collector of the third NPN transistor BN27.

The temperature sensing unit 510 may measure a temperature of an IC chip in which the temperature sensing circuit 500 is placed by detecting a change of voltages between the base and the emitter of each of the NPN transistors between the first node N9 and the ground voltage according to a temperature. The NPN transistors between the first node N9 and the ground voltage include the third transistor BN27 and the first transistor BN 29. Each of the NPN transistors between the first node N9 and the ground voltage may be connected in a diode form. It will be understood that each of the third transistor BN27 and the third transistor BN 29 operates as a diode.

The buffer unit 620 may include a first NMOS transistor MN21, a second NMOS transistor MN22, a third NMOS transistor MN23, and a fourth NMOS transistor MN24. The first NMOS transistor MN21 may have a gate and a drain commonly connected to the current source IS6. The second NMOS transistor MN22 may have a gate connected to the gate of the first NMOS transistor MN21, and a drain connected to the supply voltage VDD. The third NMOS transistor MN23 may have a gate and a drain commonly connected to a source of the first NMOS transistor MN21, and a source connected to the first node N11. The fourth NMOS transistor MN24 may have a gate connected to the gate of the third NMOS transistor MN23, a drain connected to a source of the second NMOS transistor MN22, and a source connected to the second node N12.

Figure 7:
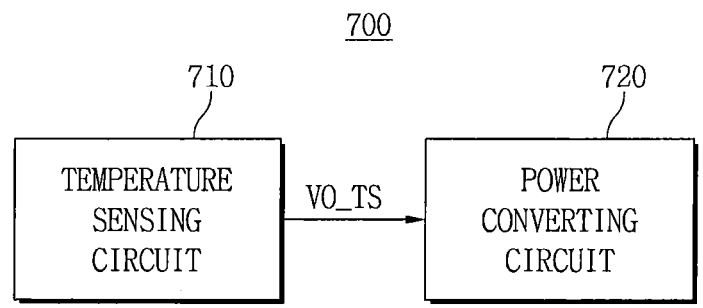
FIG. 7 is a block diagram illustrating a power converting system including a temperature sensing circuit in accordance with some embodiments of the present inventive concept.

FIG. 7 is a block diagram illustrating a power converting system including a temperature sensing circuit in accordance with some embodiments of the present inventive concept. Referring to FIG. 7, a power converting system 700 may include a temperature sensing circuit 710 and a power converting circuit 720.

The temperature sensing circuit 710 may include a temperature sensing circuit according to some embodiments of the present inventive concept. The temperature sensing circuit 710 may include a temperature sensing unit and a buffer unit and may measure a temperature of an IC chip using a change of a forward voltage of a transistor, which operates as a diode, according to a temperature. The temperature sensing circuit 710 may output a first temperature sensing voltage and may buffer the first temperature sensing voltage to generate a second temperature sensing voltage VO_TS. According to some embodiments of the present inventive concept, the buffer unit may have a cascode emitter-follower structure or a cascode source-follower structure. The power converting circuit 720 may convert a DC input voltage into a stable DC output voltage in response to the second temperature sensing voltage VO_TS.

Figure 8:
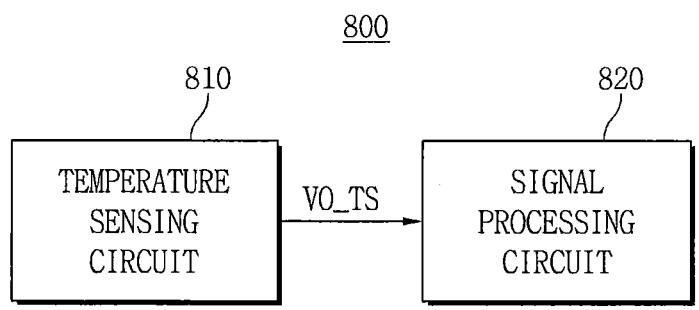
FIG. 8 is a block diagram illustrating a signal processing system including a temperature sensing circuit in accordance with some embodiments of the present inventive concept.

FIG. 8 is a block diagram illustrating a signal processing system including a temperature sensing circuit in accordance with some embodiments of the present inventive concept. Referring to FIG. 8, a signal processing system 800 may include a temperature sensing circuit 810 and a signal processing circuit 820.

The temperature sensing circuit 810 may include a temperature sensing circuits according to some embodiments of the present inventive concept. The temperature sensing circuit 810 may include a temperature sensing unit and a buffer unit and may measure a temperature of an IC chip using a change of a forward voltage of a transistor, which operates as a diode, according to a temperature. The temperature sensing circuit 810 may output a first temperature sensing voltage and may buffer the first temperature sensing voltage to generate a second temperature sensing voltage VO_TS. In some embodiments of the present inventive concept, the buffer unit may have a cascode emitter-follower structure or a cascode source-follower structure. The signal processing circuit 820 may perform a signal processing in response to the second temperature sensing voltage VO_TS.

A temperature sensing circuit according to some embodiments of the present inventive concept may include a temperature sensing unit and a buffer unit. The temperature sensing circuit may measure a temperature of an IC chip using a change of a forward voltage of a transistor, which operates as a diode, according to a temperature. The temperature sensing circuit may output a first temperature sensing voltage and may buffer the first temperature sensing voltage to generate a second temperature sensing voltage. In various embodiments of the present inventive concept, the buffer unit may have a cascode emitter-follower structure or a cascode source-follower structure. A temperature sensing circuit according to some embodiments of the present inventive concept may generate a temperature sensing voltage insensitive to noise and may occupy a small area.

Some embodiments of the present inventive concept may be applied to a semiconductor device and, particularly to a semiconductor device including a temperature sensing circuit.

The foregoing detailed description is to be considered illustrative and not restrictive, and the appended claims are intended to cover all such modifications, enhancements, and other embodiments, which fall within the true spirit and scope of the inventive concept. Thus, to the maximum extent allowed by law, the scope is to be determined by the broadest permissible interpretation of the following claims and their equivalents, and shall not be restricted or limited by the foregoing detailed description.

What is claimed is:

1. A temperature sensing circuit comprising:
   a sensing circuit configured to measure a temperature of an integrated circuit device using a change of a forward voltage of a transistor that operates as a diode responsive to the temperature, wherein the sensing circuit is configured to output a first temperature sensing voltage, corresponding to the forward voltage of the transistor, at a first node; and
   a buffer circuit having a cascode emitter-follower structure, wherein the buffer circuit is configured to buffer the first temperature sensing voltage and to output a second temperature sensing voltage at a second node, wherein a current flowing through the buffer circuit has a magnitude that is substantially equal to a magnitude of a current flowing through the sensing circuit.

2. The circuit of claim 1, wherein the sensing circuit has a cascode current mirror structure.

3. The circuit of claim 1, further comprising a current source that is connected to a power source that is configured to provide a supply voltage and is configured to supply the current flowing through the buffer circuit.

4. The circuit of claim 3, wherein the sensing circuit comprises:
   a first NPN transistor having a base and a collector commonly connected to the first node; and
   a second NPN transistor having a base connected to the base of the first NPN transistor and a collector connected to the second node.

5. The circuit of claim 4, wherein the buffer circuit comprises:
   a third NPN transistor having a base and a collector commonly connected to the current source;
   a fourth NPN transistor having a base connected to the base of the third NPN transistor, and a collector connected to the power source;
   a fifth NPN transistor having a base and a collector commonly connected to an emitter of the third NPN transistor, and an emitter connected to the first node; and
   a sixth NPN transistor having a base connected to the base of the fifth NPN transistor, a collector connected to an emitter of the fourth NPN transistor, and an emitter connected to the second node.

6. The circuit of claim 3, wherein the sensing circuit comprises:
   a first NPN transistor having a base and a collector commonly connected to the first node;
   a second NPN transistor having a base connected to the base of the first NPN transistor, and a collector connected to the second node;
   a third NPN transistor having a base and a collector commonly connected to an emitter of the first NPN transistor, and an emitter connected to a ground voltage; and
   a fourth NPN transistor having a base connected to the base of the third NPN transistor, a collector connected to an emitter of the second NPN transistor, and an emitter connected to the ground voltage.

7. The circuit of claim 6, wherein:
   the sensing circuit is disposed in the integrated circuit device;
   the transistor that operates as a diode comprises the first NPN transistor and the third NPN transistor; and
   the forward voltage of the transistor comprises a forward voltage between the base and the emitter of the first NPN transistor and a forward voltage between the base and the emitter of the third NPN transistor.

8. The circuit of claim 6, wherein the buffer circuit comprises:
   a fifth NPN transistor having a base and a collector commonly connected to the current source;

a sixth NPN transistor having a base connected to the base of the fifth NPN transistor, and a collector connected to the power source;

a seventh NPN transistor having a base and a collector commonly connected to an emitter of the fifth NPN transistor, and an emitter connected to the first node; and an eighth NPN transistor having a base connected to the base of the seventh NPN transistor, a collector connected to an emitter of the sixth NPN transistor, and an emitter connected to the second node.

9. A temperature sensing circuit, comprising:

a sensing circuit configured to measure a temperature of an integrated circuit device using a change of a forward voltage of a transistor that operates as a diode responsive to the temperature, wherein the sensing circuit is configured to output a first temperature sensing voltage, corresponding to the forward voltage of the transistor, at a first node; and a buffer circuit having a cascode source-follower structure, wherein the buffer circuit is configured to buffer the first temperature sensing voltage and to output a second temperature sensing voltage at a second node, wherein a current flowing through the buffer circuit has a magnitude that is substantially equal to a magnitude of a current flowing through the sensing circuit.

10. The circuit of claim 9, further comprising a current source that is connected to a power source that is configured to provide a supply voltage and is configured to supply the current flowing through the buffer circuit.

11. The circuit of claim 10, wherein the sensing circuit comprises:

a first NPN transistor having a base and a collector commonly connected to the first node;

a second NPN transistor having a base connected to the base of the first NPN transistor, and a collector connected to the second node;

a third NPN transistor having a base and a collector commonly connected to an emitter of the first NPN transistor, and an emitter connected to a ground voltage; and a fourth NPN transistor having a base connected to the base of the third NPN transistor, a collector connected to an emitter of the second NPN transistor, and an emitter connected to the ground voltage.

12. The circuit of claim 11, wherein the buffer circuit comprises:

a first NMOS transistor having a gate and a drain commonly connected to the current source;

a second NMOS transistor having a gate connected to the gate of the first NMOS transistor, and a drain connected to the power source;

a third NMOS transistor having a gate and a drain commonly connected to a source of the first NMOS transistor, and a source connected to the first node; and a fourth NMOS transistor having a gate connected to the gate of the third NMOS transistor, a drain connected to a source of the second NMOS transistor, and a source connected to the second node.

13. A temperature sensing circuit comprising:

a sensing circuit comprising a transistor that has a first pair of terminals having a first PN junction of the transistor therebetween and a second pair of terminals having a second PN junction of the transistor therebetween, wherein the first pair of terminals are connected together, and the sensing circuit is configured to output a first temperature sensing voltage comprising a voltage between the second pair of terminals at a first node; and a buffering circuit having an input connected to the first node, wherein the buffering circuit has a cascode follower structure and is configured to output a second temperature sensing voltage that has a magnitude proportional to a magnitude of the first temperature sensing voltage at a second node.

14. The temperature sensing circuit of claim 13, wherein:

the transistor comprises a first transistor having a third pair of terminals having a third PN junction of the first transistor therebetween and a fourth pair of terminals having a fourth PN junction of the first transistor therebetween, wherein the third pair of terminals are connected together; and the sensing circuit further comprises a second transistor between the first transistor and the first node, wherein the second transistor has a fifth pair of terminals having a fifth PN junction of the second transistor therebetween and a sixth pair of terminals having a sixth PN junction of the second transistor therebetween, the fifth pair of terminals are connected together, and the first temperature sensing voltage comprises a first voltage between the fourth pair of terminals of the first transistor and the sixth pair of terminals of the second transistor.

15. The temperature sensing circuit of claim 13, wherein the buffering circuit has less than two inputs.

16. The temperature sensing circuit of claim 13, wherein the input of the buffering circuit is not a differential input.

17. The temperature sensing circuit of claim 13, further comprising:

a power source configured to provide a supply voltage; and a current source connected to the power source, wherein the current source is configured to supply a current to the buffering circuit.

18. The temperature sensing circuit of claim 17, wherein the buffering circuit has a cascode emitter-follower structure comprising:

a first bipolar transistor having a first base and a first collector connected together and are connected to the current source;

a second bipolar transistor having a second base that is connected to the first base and a second collector that is connected to the power source;

a third bipolar transistor having a third base and a third collector connected together and are connected to a first emitter of the first bipolar transistor and a third emitter that is connected to the first node; and a fourth bipolar transistor having a fourth base that is connected to the third base, a fourth collector that is connected to a second emitter of the second bipolar transistor and a fourth emitter that is connected to the second node.

19. The temperature sensing circuit of claim 17, wherein the buffering circuit has a cascode source-follower circuit comprising:

a first field effect transistor having a first gate and a first drain connected together and are connected to the current source;

a second field effect transistor having a second gate that is connected to the first gate and a second drain that is connected to the power source;

a third field effect transistor having a third gate and a third drain connected together and connected to a first source of the first field effect transistor and a third source that is connected to the first node; and a fourth field effect transistor having a fourth gate that is connected to the third gate, a fourth drain that is connected to a second source of the second field effect transistor and a fourth source that is connected to the second node.

* * * * *